United States Patent
Donton, Sr.

(10) Patent No.: US 10,974,942 B1
(45) Date of Patent: Apr. 13, 2021

(54) CELL FUNNEL SYSTEM

(71) Applicant: Jason L. Donton, Sr., Clearwater, FL (US)

(72) Inventor: Jason L. Donton, Sr., Clearwater, FL (US)

( * ) Notice: Subject to any disclaimer, the term of this patent is extended or adjusted under 35 U.S.C. 154(b) by 375 days.

(21) Appl. No.: 15/495,416

(22) Filed: Apr. 24, 2017

Related U.S. Application Data

(60) Provisional application No. 62/361,252, filed on Jul. 12, 2016.

(51) Int. Cl.
| | |
|---|---|
| *B67C 11/02* | (2006.01) |
| *E04B 2/26* | (2006.01) |
| *B65G 11/18* | (2006.01) |
| *E04G 21/02* | (2006.01) |
| *E04G 21/04* | (2006.01) |

(52) U.S. Cl.
CPC .............. *B67C 11/02* (2013.01); *B65G 11/18* (2013.01); *E04B 2/26* (2013.01); *E04G 21/025* (2013.01); *E04G 21/04* (2013.01)

(58) Field of Classification Search
CPC ... B65G 11/18; E04G 17/002; E04G 21/0481; E04G 21/025; E04G 21/04; E04H 4/0081; B67C 11/00; B67C 11/02
See application file for complete search history.

(56) References Cited

U.S. PATENT DOCUMENTS

| | | | | |
|---|---|---|---|---|
| 952,313 | A * | 3/1910 | Droz ....................... | B67C 11/02 141/334 |
| 2,260,430 | A * | 10/1941 | Blasingame ............ | B67C 11/02 141/334 |
| 3,255,570 | A * | 6/1966 | Weimer .................. | B65B 67/04 141/108 |
| 3,764,222 | A * | 10/1973 | Orthman ................. | E04G 21/20 222/144.5 |
| 4,108,222 | A * | 8/1978 | Kaufman ............... | B65G 11/02 141/337 |
| 4,409,764 | A * | 10/1983 | Wilnau ................... | E04B 1/165 52/127.3 |
| 4,572,782 | A * | 2/1986 | Smith ...................... | B07B 1/46 193/3 |
| 4,800,875 | A * | 1/1989 | Ray ....................... | A61F 2/4601 141/331 |
| 5,450,700 | A * | 9/1995 | Hackman .................. | E04B 2/20 264/35 |

(Continued)

*Primary Examiner* — Jessie T Fonseca
(74) *Attorney, Agent, or Firm* — GrayRobinson, P.A.; Michael J. Colitz, III

(57) ABSTRACT

A funnel is formed with a planar base having a forward edge, a rearward edge, and parallel side edges. The funnel has side walls extending upwardly and outwardly from the side edges at an angle from horizontal. The funnel has a rear wall extending upwardly and rearwardly from the rearward edge at an angle from horizontal. The base and the side walls and the rear wall form a chamber with a forward passageway. A support assembly removably couples the funnel to an edge. The support assembly includes a forward support plate extending downwardly from the forward edge of the base at an angle from horizontal. The support assembly includes a rearward support plate extending downwardly from the base parallel with the forward support plate from a location spaced rearwardly from the forward support plate.

8 Claims, 3 Drawing Sheets

(56) References Cited

U.S. PATENT DOCUMENTS

| | | | | |
|---|---|---|---|---|
| 5,458,169 | A * | 10/1995 | Biafore | E04G 21/20 |
| | | | | 141/237 |
| 5,546,803 | A * | 8/1996 | Reynolds | E04G 21/20 |
| | | | | 52/749.13 |
| 5,732,753 | A * | 3/1998 | Danzi | B67C 11/02 |
| | | | | 141/331 |
| 6,182,842 | B1 * | 2/2001 | Dowling | B65G 11/023 |
| | | | | 193/2 A |
| 6,460,581 | B1 * | 10/2002 | Marshall | E04G 21/025 |
| | | | | 141/331 |
| 8,336,585 | B2 * | 12/2012 | Royce | B28C 5/4244 |
| | | | | 141/331 |
| 8,485,234 | B2 * | 7/2013 | Pfaff | B62J 31/00 |
| | | | | 141/333 |
| 8,522,948 | B1 * | 9/2013 | Galvin, IV | B65G 11/026 |
| | | | | 193/10 |
| 2009/0229706 | A1 * | 9/2009 | Royce | E04G 21/025 |
| | | | | 141/331 |
| 2012/0047845 | A1 * | 3/2012 | Lest | E04G 21/04 |
| | | | | 52/742.14 |
| 2012/0291917 | A1 * | 11/2012 | Bera | E04G 21/0481 |
| | | | | 141/391 |
| 2013/0213762 | A1 * | 8/2013 | Gustafson | B65G 11/18 |
| | | | | 193/2 A |

* cited by examiner

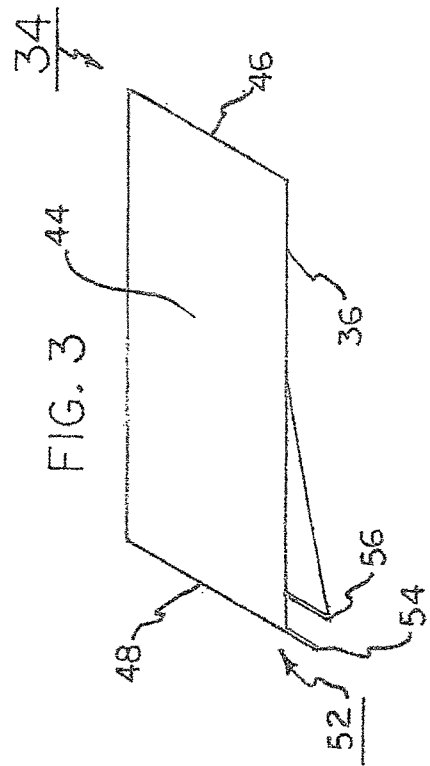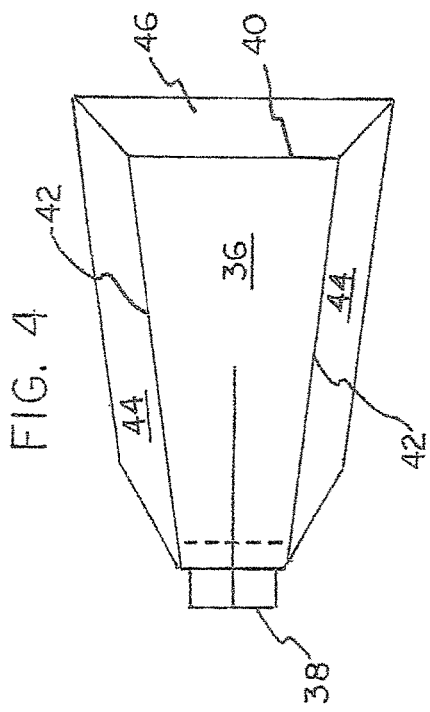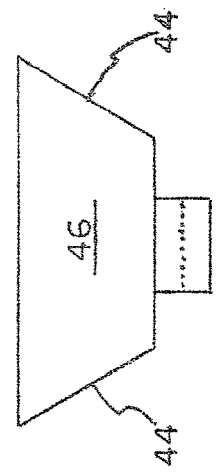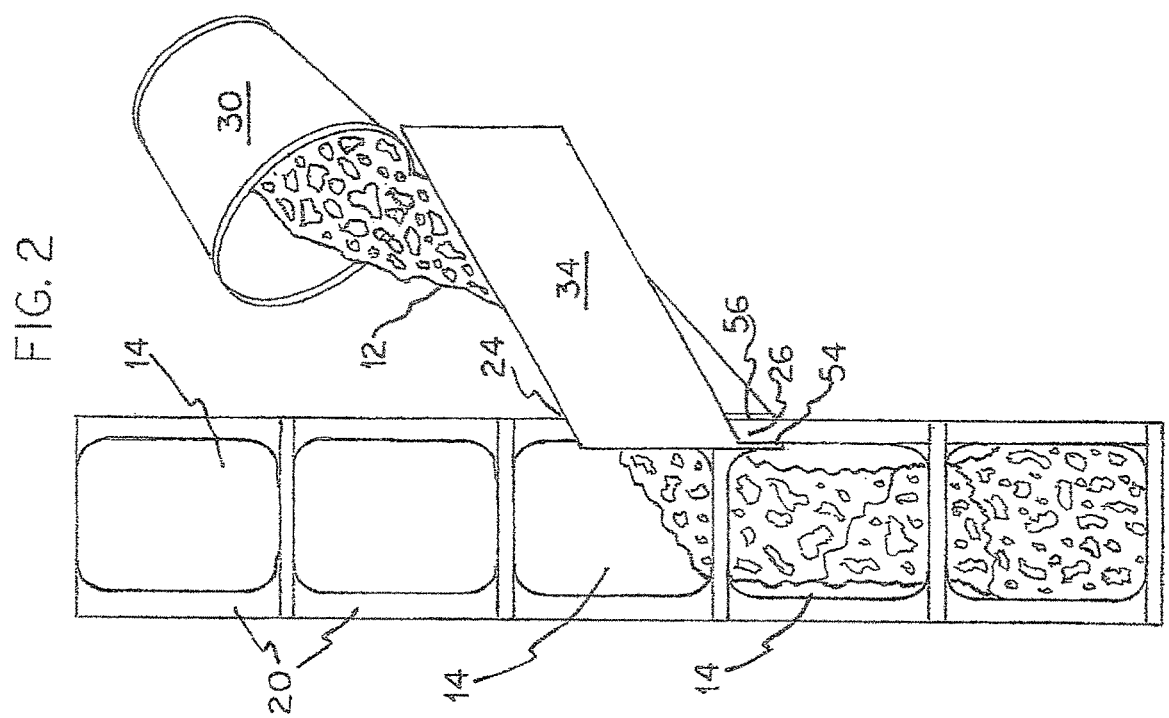

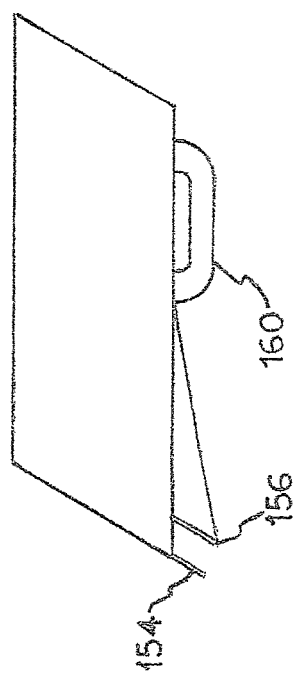
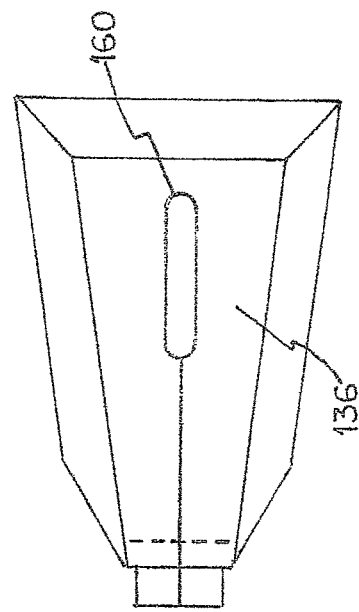
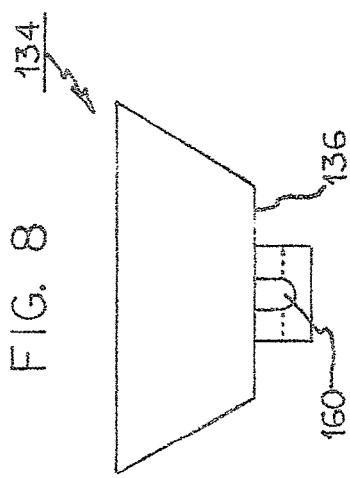

CELL FUNNEL SYSTEM

RELATED APPLICATION

This non-provisional patent application is based upon and claims the benefit of Provisional Application No. 62/361,252 filed Jul. 12, 2016, the subject matter of which is incorporated herein by reference.

BACKGROUND OF THE INVENTION

Field of the Invention

The present invention relates to a cell funnel system and more particularly pertains to pouring cementitious material into elevationally spaced cells of a cinder block wall for strengthening in association with cutting doorways and window openings.

Description of the Prior Art

The use of funnels is known in the prior art. More specifically, funnels previously devised and utilized for the purpose of pouring materials are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a cell funnel system that allows supporting a funnel hands-free and pouring cementitious material through the funnel into cinder block cells.

In this respect, the cell funnel system according to the present invention substantially departs from the conventional concepts and designs of the prior art, and in doing so provides an apparatus primarily developed for the purpose of supporting a funnel hands-free and pouring cementitious material through the funnel into cinder block cells.

Therefore, it can be appreciated that there exists a continuing need for a new and improved cell funnel system which can be used for supporting a funnel hands-free and pouring cementitious material through the funnel into cinder block cells. In this regard, the present invention substantially fulfills this need.

SUMMARY OF THE INVENTION

In view of the disadvantages inherent in the known types of funnels now present in the prior art, the present invention provides an improved cell funnel system. As such, the general purpose of the present invention, which will be described subsequently in greater detail, is to provide a new and improved cell funnel system and method which has all the advantages of the prior art and none of the disadvantages.

To attain this, from a broad perspective, the present invention essentially comprises a funnel formed with a planar base having a forward edge, a rearward edge, and parallel side edges. The funnel has side walls extending upwardly and outwardly from the side edges at an angle from horizontal. The funnel has a rear wall extending upwardly and rearwardly from the rearward edge at an angle from horizontal. The base and the side walls and the rear wall form a chamber with a forward passageway. A support assembly is provided for removably coupling the funnel to an edge. The support assembly includes a forward support plate extending downwardly from the forward edge of the base at an angle from horizontal. The support assembly includes a rearward support plate extending downwardly from the base parallel with the forward support plate from a location spaced rearwardly from the forward support plate.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cell funnel system which has all of the advantages of the prior art funnels and none of the disadvantages.

It is another object of the present invention to provide a new and improved cell funnel system which may be easily and efficiently manufactured and marketed.

It is a further object of the present invention to provide a new and improved cell funnel system which is of durable and reliable constructions.

An even further object of the present invention is to provide a new and improved cell funnel system which is susceptible of a low cost of manufacture with regard to both materials and labor, and which accordingly is then susceptible of low prices of sale to the consuming public, thereby making such cell funnel system economically available to the buying public.

Lastly, it is an object of the present invention to provide a cell funnel system for supporting a funnel hands-free and pouring cementitious material through the funnel into cinder block cells.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an enlarged showing of the bucket and the funnel and a portion of the wall illustrated in FIG. 1.

FIG. 3 is a side elevational view of the funnel shown in FIGS. 1 and 2.

FIG. 4 a bottom view of the funnel shown in FIG. 3

FIG. 5 is a rear elevational view of the funnel shown in FIGS. 3 and 4.

FIG. 6 is a side elevational view of an alternate embodiment of the invention.

FIG. 7 a bottom view shown in the funnel shown in FIG. 6.

FIG. 8 is a rear elevational view of the funnel shown in FIGS. 6 and 7.

The same reference numerals refer to the same parts throughout the various Figures for the primary embodiment and for the alternate embodiment of the invention.

DESCRIPTION OF THE PREFERRED EMBODIMENT

Figure 1:
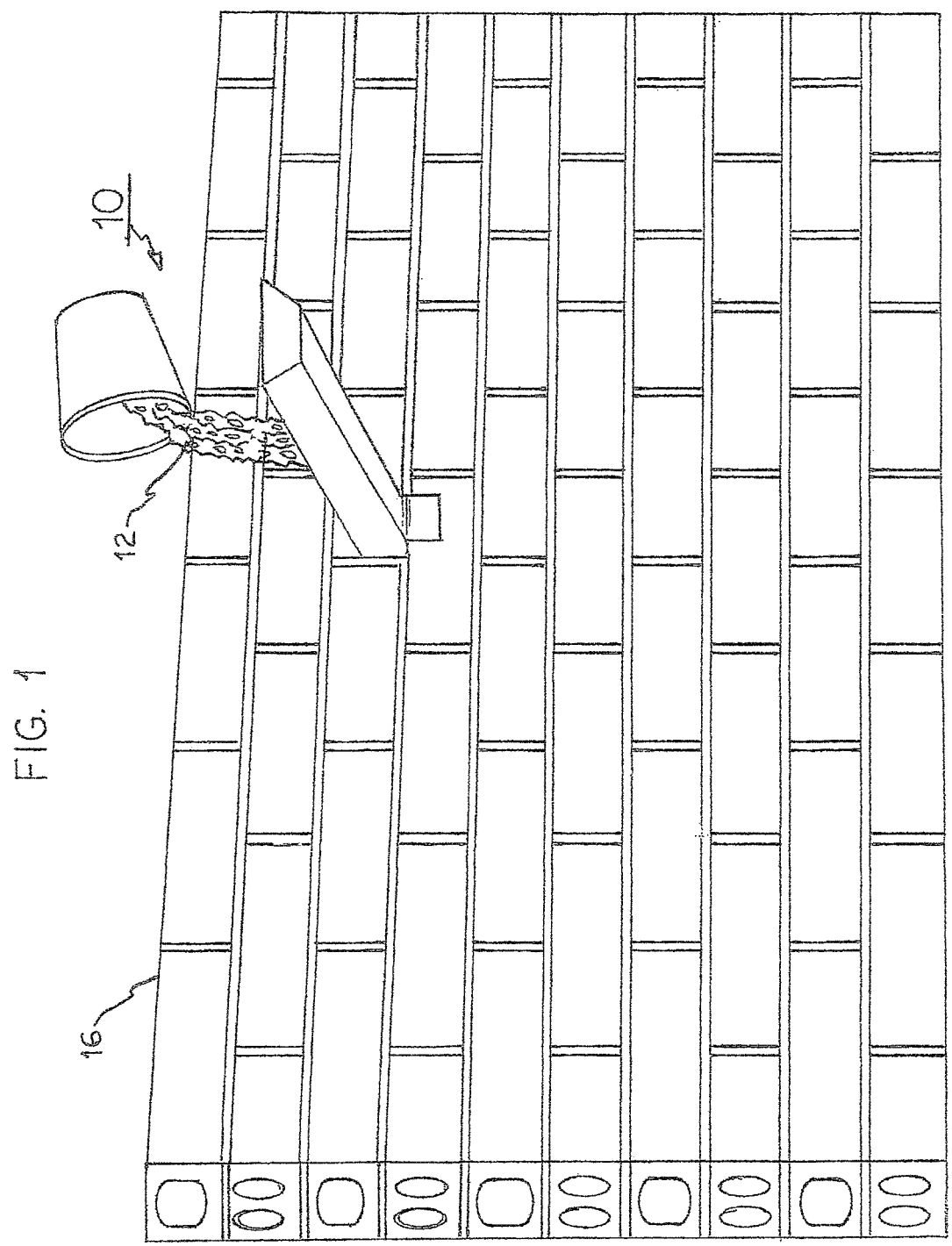
FIG. 1 is a perspective illustration of a cell funnel system constructed in accordance with the principles of the present invention.

With reference now to the drawings, and in particular to FIG. 1 thereof, the preferred embodiment of the new and improved xtitle embodying the principles and concepts of the present invention and generally designated by the reference numeral 10 will be described.

The present invention, the cell funnel system 10 is comprised of a plurality of components. Such components in their broadest context include a funnel and a support assembly. Such components are individually configured and correlated with respect to each other so as to attain the desired objective.

More specifically, the preferred embodiment of the invention is designated by reference numeral 10. It is a cell funnel system 10 for pouring cementitious material 12 into elevationally spaced cells 14 of a cinder block wall 16 for strengthening in association with cutting doorways and window openings. The strengthening may be done either prior to or after the cutting of the opening. The pouring and the strengthening are done in a safe, convenient, and economical manner. The system includes a wall 16 formed of cinder blocks 20. The cinder blocks are stacked in a staggered pattern in elevationally spaced courses. The courses include a bottom course, a top course, and a plurality of intermediate courses there between. Each cinder block has a top, a bottom, a front face, and a back face. Each cinder block has side faces. Each cinder block has at least one cell 14 extending vertically there through between the top and the bottom. A knock out hole 24 in the wall extends through a front face at an elevation adjacent to an uppermost extent of an opening for a door and/or a window cut into the wall. The knock out hole forms an upwardly facing lip 26 created by the front face of the cinder block at the knock out hole.

Next provided is a lifting tool 30. The lifting tool may take the form of a bucket, a shovel, or the like. The lifting tool functions for transporting cementitious material to an elevation above the knock out hole in the cinder block.

A funnel 34 is next provided. The funnel is formed with a rectangular planar base 36 having a forward edge 38 and a rearward edge 40 longitudinally spaced by a length of 20 inches, plus or minus 20 percent. The planar base 36 has parallel side edges 42 laterally spaced by a width of 6 inches, plus or minus 20 percent, rearwardly and 4 inches, plus or minus 20 percent, forwardly. The funnel has side walls 44 with a height of 6 inches, plus or minus 20 percent, extending upwardly and outwardly from the side edges at an angle of 20 to 30 degrees from horizontal. The funnel has a rear wall 46 with a height of 6 inches, plus or minus 20 percent, extending upwardly and rearwardly from the rearward edge at an angle of 20 to 30 degrees from horizontal. The base, the side walls, and the rearward wall form a chamber with an open front passageway 48.

Lastly provided is a support assembly 52 for removably coupling the funnel to the edge of the knock out hole formed in the wall. The support assembly includes a forward support plate 54. The forward support plate has a width of 4 inches, plus or minus 20 percent, and a height of 1 inch, plus or minus 20 percent. The forward support plate extends downwardly from the forward edge of the base at an angle of 20 to 30 degrees from horizontal. The support assembly includes a rearward support plate 56 having a width of 4 inches, plus or minus 20 percent, and a height of 4 inches, plus or minus 20 percent. The rearward support plate extends downwardly from the base from a location 2 inches, plus or minus 20 percent, rearwardly from the forward support plate downwardly at an angle of 20 to 30 degrees plus or minus 20 percent, from horizontal. Rigidity to the system may be provided through a brace between the rearward support plate and the lower surface of the base.

In this manner, the funnel is removably coupled with the front and rear support plates spanning the upper edge of the knock out hole to allow a user access to handling the lifting tool and pouring the cementitious material with two hands.

In an alternate embodiment of the invention, illustrated in FIGS. 6-8, the funnel 134 includes the base 136 with upwardly and outwardly extending rear and side walls and downwardly facing support plates 154, 156. In this alternate embodiment, a handle 160 is provided. The handle is in a U-shaped configuration extending downwardly from the base. The handle is in a location closer to the rearward edge than to the support plates.

The funnel of the present invention, whether the primary embodiment or the alternate embodiment, is fabricated of a rigid material such as plastic or metal. If plastic, it is preferably molded of one piece. If metal, such as stainless steel, the components are coupled together as by welding or the like.

The primary embodiment of the funnel system of the present invention is for use in the building trade. It should be understood, however, that the system is adaptable for a wide variety of uses. Consider, for example, that the system is adapted to receive and dispense many flowable materials. The flowable material is adapted to be a cementitious material. The flowable material is also adapted to be a granular animal feed material. As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A funnel system comprising:
    a wall of cinder blocks with a knock out hole;
    a lifting tool;
    a funnel formed with a planar base having a forward edge and a rearward edge longitudinally spaced by a length of 20 inches, plus or minus 20 percent, and side edges laterally spaced by a width of 6 inches, plus or minus 20 percent rearwardly and 4 inches, plus or minus 20 percent forwardly, the funnel having side walls extending upwardly and outwardly from the side edges at an angle of 60 degrees from horizontal, the funnel having a rear wall extending upwardly and rearwardly from the rearward edge at an angle of 60 degrees from horizontal, the planar base and the side walls and the rear wall forming a chamber with a forward passageway; and
    a support assembly for removably coupling the funnel to an edge, the support assembly including a forward support plate having a width of 4 inches, plus or minus 20 percent, and a height of 5 inches, plus or minus 20 percent extending downwardly from the forward edge of the planar base at an angle of 60 degrees from horizontal, the support assembly including a rearward support plate having a width of 4 inches, plus or minus 20 percent and a height of 8 inches, plus or minus 20 percent, extending downwardly at an angle of 25 degrees plus or minus 20 percent from horizontal from the planar base parallel with the forward support plate from a location spaced rearwardly from the forward support plate.

2. The system as set forth in claim 1 wherein the funnel is adapted to receive and dispense a flowable material.

3. The system as set forth in claim 2 wherein the flowable material is a cementitious material.

4. The system as set forth in claim 2 wherein the flowable material is a granular animal feed material.

5. The system as set forth in claim 1 wherein during use the forward support plate and the rearward support plate are vertically oriented and the planar base is at an angle of from 20 to 30 degrees from horizontal.

6. The system as set forth in claim 1 wherein the cinder blocks are stacked in a staggered pattern in elevationally spaced courses, the courses including a bottom course and a top course and a plurality of intermediate courses there between, each cinder block having a top and a bottom and a front face and a back face, each cinder block having side faces, each cinder block having at least one cell extending vertically there through between the top and the bottom, the knock out hole in the wall being through one of the front faces of one of the cinder blocks at an elevation adjacent to an uppermost extent of an opening for a door and a window cut into the wall, the knock out hole forming an upwardly facing lip created by the front face of the cinder block at the knock out hole for receiving the forward and rearward support plates.

7. The system as set forth in claim 1 and further including a handle (160), the handle being in a U-shaped configuration extending downwardly from the base closer to the rearward edge than to the support plates.

8. A cell funnel system (10) for pouring cementitious material (12) into elevationally spaced cells (14) of a cinder block wall (16) for strengthening in association with cutting doorways and window openings, the system comprising, in combination:
    the wall (16) being formed of cinder blocks (20), the cinder blocks being stacked in a staggered pattern in elevationally spaced courses, the courses including a bottom course and a top course and a plurality of intermediate courses there between, each cinder block having a top and a bottom and a front face and a back face and side faces, each cinder block having at least one cell (14) extending vertically there through between the top and the bottom, a knock out hole (24) in the wall through one of the front faces of one of the cinder blocks at an elevation adjacent to an uppermost extent of an opening for a door and a window cut into the wall, the knock out hole forming an upwardly facing lip (26) created by the front face of the cinder block at the knock out hole;
    a lifting tool (30) for transporting cementitious material to an elevation above the knock out hole in the cinder block;
    a funnel (34) formed with a rectangular planar base (36) having a forward edge (38) and a rearward edge (40) longitudinally spaced by a length of 20 inches, plus or minus 20 percent, the planar base (36) having side edges (42) laterally spaced by a width of 6 inches, plus or minus 20 percent, rearwardly and 4 inches, plus or minus 20 percent, forwardly, the funnel having side walls (44) with a height of 6 inches, plus or minus 20 percent, extending upwardly and outwardly from the side edges at an angle of 60 degrees from horizontal, the funnel having a rear wall (46) with a height of 6 inches, plus or minus 20 percent, extending upwardly and rearwardly from the rearward edge at an angle of 60 degrees from horizontal, the base and the side walls and the rearward wall forming a chamber with an open front passage way (48); and
    a support assembly (52) for removably coupling the funnel to the edge of the knock out hole formed in the wall, the support assembly including a forward support plate (54), the forward support plate having a width of 4 inches, plus or minus 20 percent, and a height of 5 inches, plus or minus 20 percent, the forward support plate extending downwardly from the forward edge of the base, the forward support plate extending downwardly at an angle of 60 degrees from horizontal, the support assembly including a rearward support plate (56), the rearward support plate having a width of 4 inches, plus or minus 20 percent, and a height of 8 inches, plus or minus 20 percent, the rearward support plate extending downwardly from the base from a location 2 inches, plus or minus 20 percent, rearwardly from the forward support plate downwardly at an angle of 25 degrees plus or minus 20 percent, from horizontal, whereby the funnel is removably coupled with the forward and rearward support plates spanning the upper edge of the knock out hole to allow a user access to handling the lifting tool and pouring the cementitious material with two hands.

* * * * *